US012537320B2

(12) United States Patent
Wu et al.

(10) Patent No.: US 12,537,320 B2
(45) Date of Patent: Jan. 27, 2026

(54) RAIL HOLDING STRUCTURE OF RAIL TERMINAL

(71) Applicants: SWITCHLAB, INC., New Taipei (TW); SWITCHLAB (SHANGHAI) CO., LTD., Shanghai (CN); GAOCHENG ELECTRONICS CO., LTD., Shenzhen (CN)

(72) Inventors: Chih-Yuan Wu, New Taipei (TW); Ming-Shan Tai, New Taipei (TW)

(73) Assignees: SWITCHLAB INC., New Taipei (TW); Switchlab (Shanghai) Co., Ltd., Shanghai (CN); GAOCHENG ELECTRONICS CO., LTD., Shenzhen (CN)

( * ) Notice: Subject to any disclaimer, the term of this patent is extended or adjusted under 35 U.S.C. 154(b) by 533 days.

(21) Appl. No.: 18/053,599

(22) Filed: Nov. 8, 2022

(65) Prior Publication Data

US 2023/0216222 A1 Jul. 6, 2023

(30) Foreign Application Priority Data

Dec. 30, 2021 (TW) ................................ 110215736

(51) Int. Cl.
*H01R 9/26* (2006.01)
*H01R 9/24* (2006.01)

(52) U.S. Cl.
CPC ......... *H01R 9/2691* (2013.01); *H01R 9/2416* (2013.01)

(58) Field of Classification Search
CPC .. H01R 9/2691; H01R 9/2416; H01R 9/2633; H01R 9/26; H01R 9/2608; H01R 9/2616; H01R 9/2625; H01R 9/2641; H01R 9/265; H01R 9/2658; H01R 9/2666
See application file for complete search history.

(56) References Cited

U.S. PATENT DOCUMENTS 7,922,521 B1 * 4/2011 Wu ...................... H01R 9/2691 439/532
2021/0151911 A1 * 5/2021 Wu ...................... H01R 13/627

FOREIGN PATENT DOCUMENTS

DE 202010009293 U1 * 12/2011 ........... H01R 13/514
EP 0597191 A1 * 5/1994
EP 1860738 A1 * 11/2007 ........... H01R 9/2691

* cited by examiner

*Primary Examiner* — Renee S Luebke
*Assistant Examiner* — Paul D Baillargeon
(74) *Attorney, Agent, or Firm* — Rosenberg, Klein & Lee

(57) ABSTRACT

A rail holding structure of rail terminal includes a case body and a grounding member received in the case body. Two lateral sides of the grounding member are connected in the case body for holding a preset grounding rail. The case body is formed with two lower sections respectively corresponding to two sides of the grounding member. A foot section extends from at least one of the two lower sections. A first connection side and a second connection side are disposed on two lateral sides of the foot section. The first and second connection sides are connected with an outer sidewall of the lower section to form a socket with an open top side. A tool can be extended into the socket to pull and extend the foot section. Via the lower section, the grounding member is driven to detach from the grounding rail or hold the grounding rail.

6 Claims, 7 Drawing Sheets

RAIL HOLDING STRUCTURE OF RAIL TERMINAL

BACKGROUND OF THE INVENTION

1. Field of the Invention

The present invention relates generally to an improved rail holding structure of a rail terminal, and more particularly to a rail holding structure with improved structural strength and operational stability.

2. Description of the Related Art

A conventional terminal device or wire pressing terminal has an insulation case (generally made of plastic material), a metal component (or so-called electrical conductive component), and a leaf spring conductor (or so-called metal leaf spring). The metal component and the leaf spring conductor are enclosed in the insulation case to press and electrically connect with or release a conductive wire plugged into the terminal device, so as to control the conductive wire to connect with a preset grounding rail. Such a conventional terminal device is a technical means widely applied in various fields.

FIGS. 1 and 2 show a typical conventional rail terminal structure employing the above technical means. The conventional rail terminal structure includes a case body 3 and a grounding member 4 received in the case body 3. Wire plug-in sockets 31, for conductive wires to plug into, and operation holes 32 are each formed on the case body 3. A push member 321 is disposed in the operation hole 32. A tool can be extended into the operation hole 32 to operate the push member 321, so as to drive an internal conductive component 5 and help in connecting the conductive wire plugged into the wire plug-in socket 31 with the grounding member 4 or disconnecting the conductive wire from the grounding member 4. An elastic first section 41 and an elastic second section 42 respectively extend from two lateral sides of the grounding member 4. An elastic holding system is formed between the first and second sections 41, 42 for holding a preset grounding rail (not shown). An extension end section of the first section 41 is formed with a hook-shaped tail section 43. In addition, the case body 3 has a lower section 33 in a position corresponding to an outer lateral side of the first section 41. An inner side of the lower section 33 (adjacent to one side of the first section 41) is formed with a cavity 35 for receiving the tail section 43. A hook-shaped foot section 34 extends outward from an outer side of the lower section 33 (distal from one side of the first section 41). An insertion socket 36 is formed between the foot section 34 and an outer surface of the lower section 33, which is open to the outside environment on one single side. A tool (such as a flat-blade screwdriver) can be extended into the insertion socket 36 to pull outward and extend the foot section 34 and the lower section 33, whereby the tail section 43 is driven via the cavity 35. Accordingly, the first and second sections 41, 42 of the grounding member 4 are expanded relative to each other so that the grounding member 4 can hold or release the grounding rail.

However, in the above structure, in consideration of the convenience in (one-way) demolding of the case body 3 in the manufacturing process, the insertion socket 36 of the lower section 33 is designed with an opening 361 open to the outside environment on one single side (for demolding). Therefore, the foot section 34 is simply connected with a lateral side of the outer surface of the lower section 33. In this case, the tool (the flat-blade screwdriver) is at risk of slipping out of the insertion socket 36 through the elastically expanded opening 361. This is a shortcoming in the conventional structure. Moreover, the strength of the entire structure is poor. As a result, in practical application, when the tool (the flat-blade screwdriver) is extended into the insertion socket 36 to apply an operation force, the side of the periphery of the insertion socket 36 with the opening 361 has weaker structural strength and is easy to deform. Therefore, the opening 361 will be elastically expanded. Also, due to improper operation or after long-term use, the foot section 34 is often twisted, deformed, or damaged.

In order to improve the above shortcomings, some manufacturers utilize 3D printing processing techniques to produce the case body 3. By such processing means, without any mold for molding the case body 3, a sink with only an upper opening is formed between the foot section 34 and the outer surface of the lower section 33 of the case body 3. Interconnection sections are connected between both of the two lateral sides of the sink corresponding to the foot section 34 and the outer surface of the lower section 33. Therefore, the structural strength of the periphery of the sink is enhanced to avoid deformation and damage of the foot section 34 after forced. Also, when the tool (the flat-blade screwdriver) is extended into the sink to apply an operation force, the tool (the flat-blade screwdriver) is unlikely to slip out of the sink. This effectively improves the above shortcoming in the conventional structure. However, the 3D printing processing means not only is relatively time-consuming and troublesome, but also is unbeneficial to mass production. In addition, the 3D printing processing cost is quite high as a whole. With respect to the rail terminal product, the 3D printing processing means fails to meet the principle of economic benefits in its manufacturing process.

It is therefore a goal of the applicant to provide the rail holding structure of the rail terminal of the present invention to improve the shortcomings of the conventional rail holding structure of the rail terminal.

SUMMARY OF THE INVENTION

It is therefore a primary object of the present invention to provide a rail holding structure of a rail terminal, which includes a case body and a grounding member received in the case body. Two lateral sides of the grounding member are at least partially connected in the case body to form an elastic holding system for holding a preset grounding rail. The case body is formed with two lower sections respectively corresponding to two sides of the grounding member. A hook-shaped foot section extends outward from at least one of the two lower sections. A first connection side and a second connection side are respectively disposed on two lateral sides of the foot section. The first and second connection sides are connected with an outer sidewall of the lower section to form a socket with an open top side. The first and second connection sides serve as two lateral stoppers between the foot section and the outer sidewall. Therefore, when a tool (such as a flat-blade screwdriver) is extended into the socket to pull outward and extend the foot section, the first and second connection sides enhance the structural strength of the periphery of the socket to avoid twisting or deformation of the foot section. Also, the first and second connection sides prevent the tool from slipping out of the socket during the force application process.

It is a further object of the present invention to provide the above rail holding structure of a rail terminal, in which the first connection side has at least one set of a first connection section and a first hollow section, which are alternately arranged. The second connection side has at least one second connection section corresponding to the first hollow section. The second connection section has a configuration and a size corresponding to the configuration and the size of the first hollow section. Accordingly, a projection area of the first connection side in a transverse direction of the socket and a projection area of the second connection side in the transverse direction of the socket are staggered, whereby the demolding operation of plastic injection in a manufacturing process can be conveniently performed.

It is still a further object of the present invention to provide the above rail holding structure of a rail terminal, in which the inner sides of the first and second connection sides are respectively formed with a first guide section and a second guide section adjacent to the opening of the socket. The first guide section and the second guide section respectively are obliquely cut plane faces. The first and second guide sections serve to guide the tool to successfully slide from the outside environment into the socket.

The present invention can be best understood through the following description and accompanying drawings, wherein:

DETAILED DESCRIPTION OF THE PREFERRED EMBODIMENTS

Figure 1:
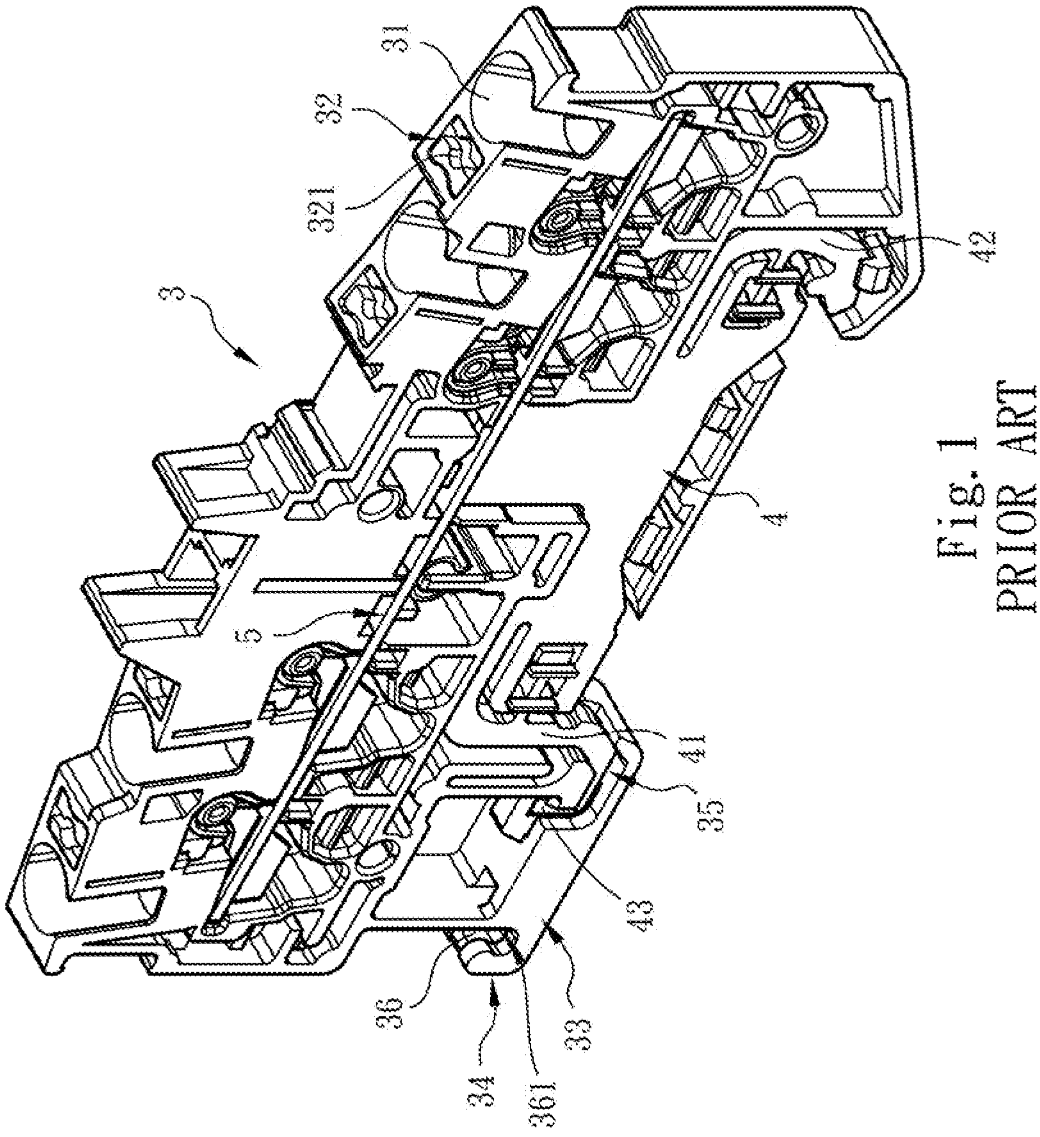
Fig. 1 PRIOR ART
FIG. 1 is a perspective view of a conventional rail terminal.
Figure 2:
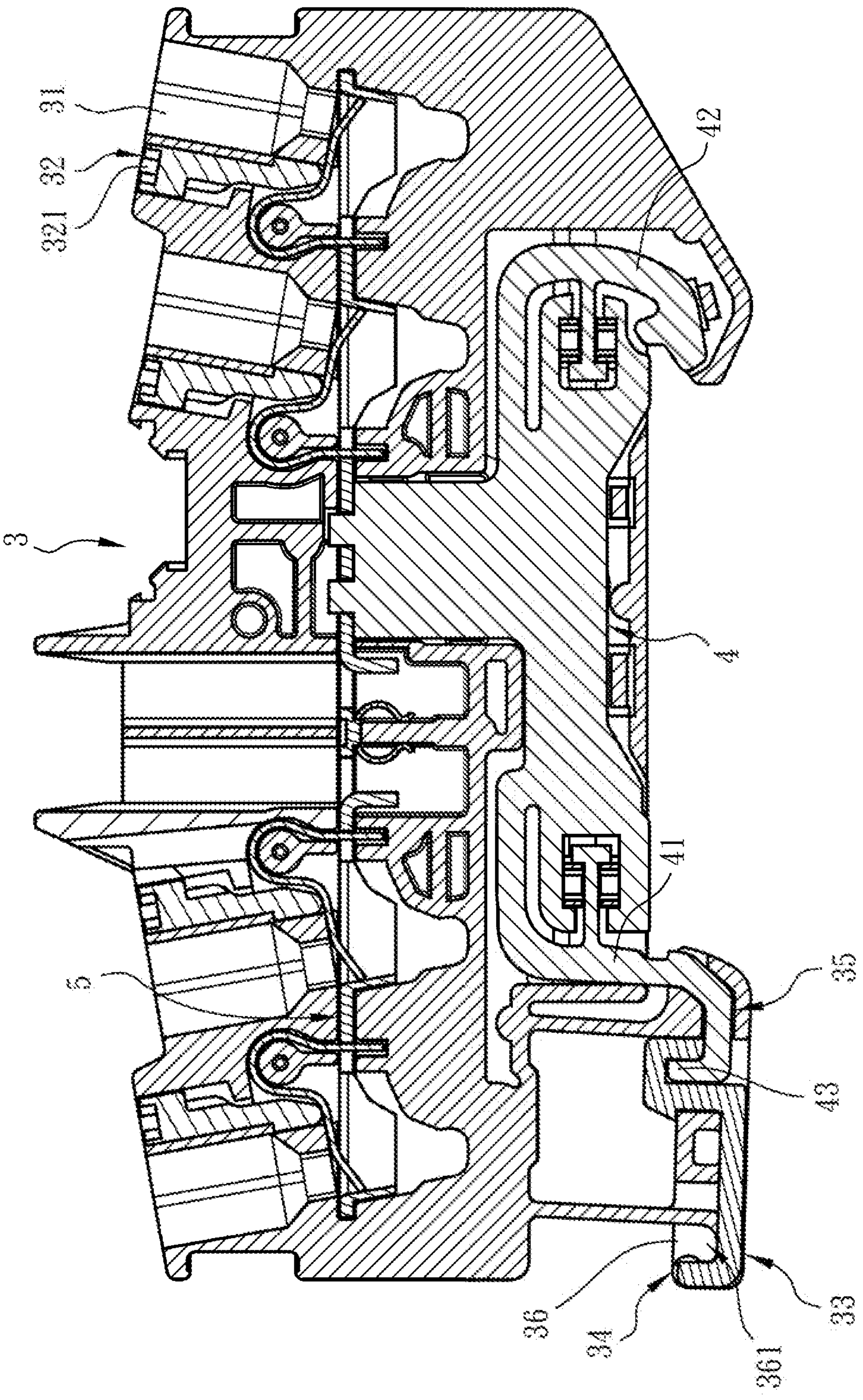
Fig. 2 PRIOR ART
FIG. 2 is a front sectional view of the conventional rail terminal.
Figure 3:
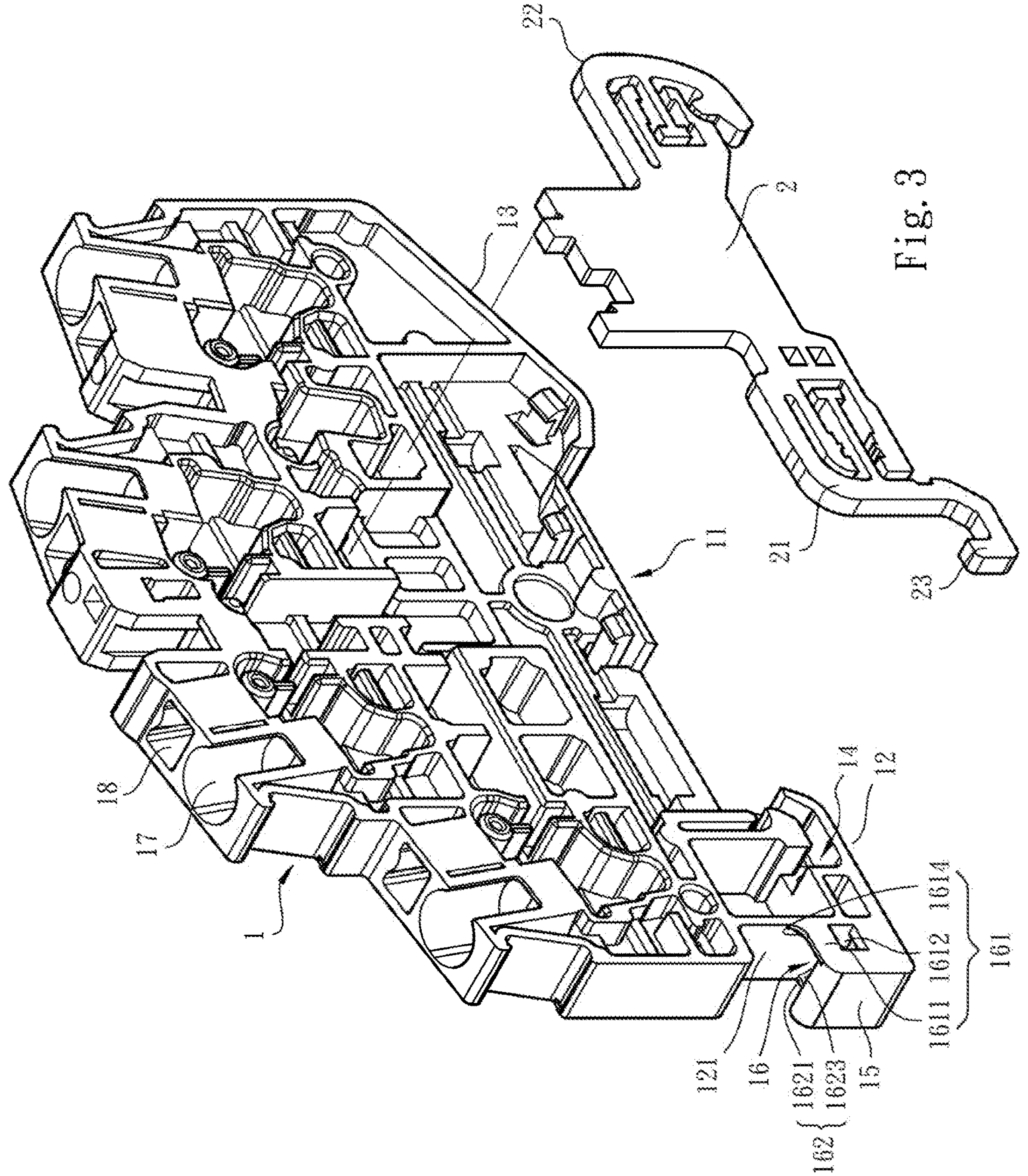
FIG. 3 is a front perspective exploded view of the rail terminal of the present invention.
Figure 4:
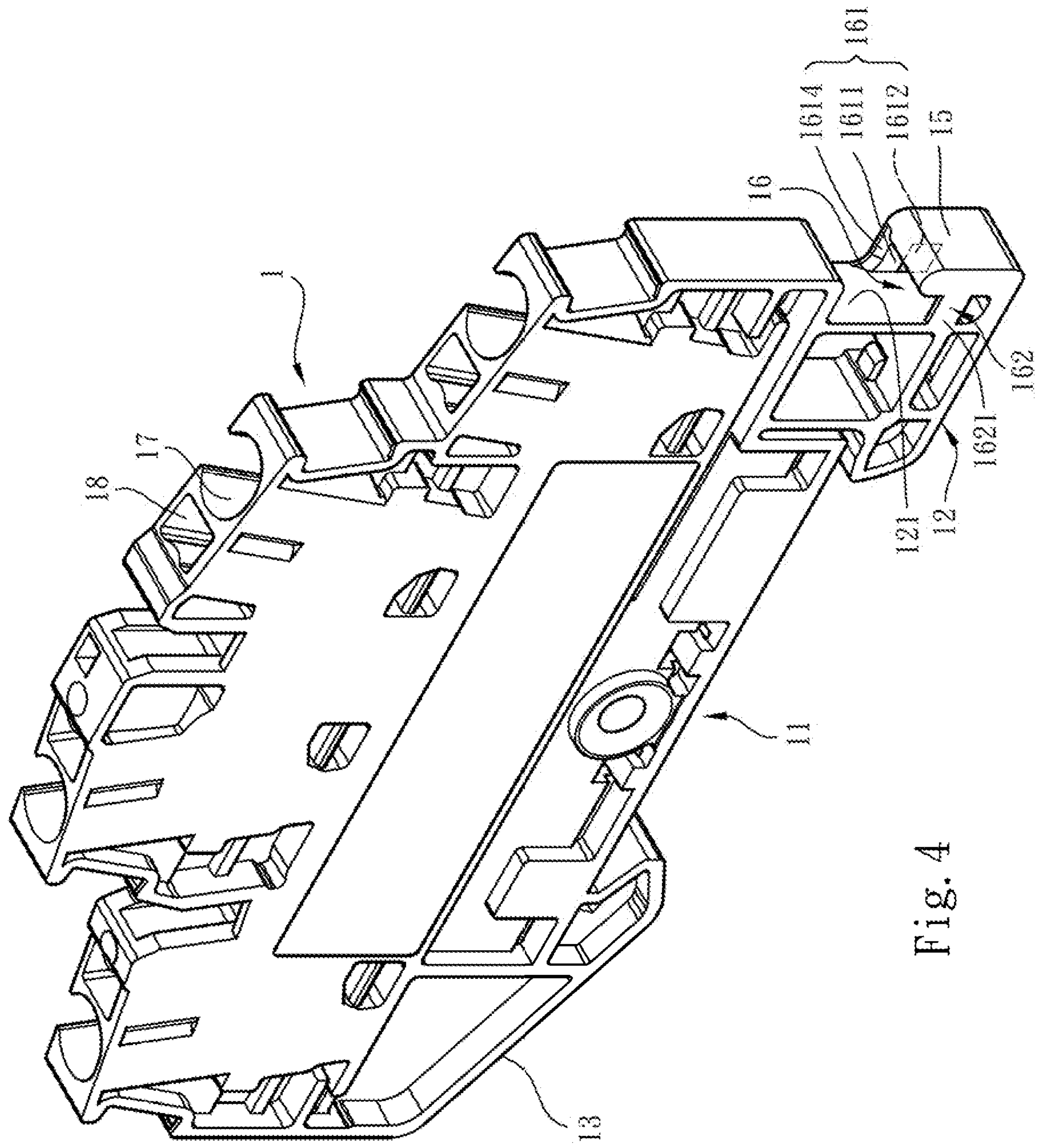
FIG. 4 is a rear perspective view of the rail terminal of the present invention.

Please refer to FIGS. 3 to 7. The rail holding structure of the rail terminal of the present invention mainly includes a case body 1 and a grounding member 2. The surface of the case body 1 is formed with a recess 11 for receiving the grounding member 2 and multiple wire plug-in sockets 17 and operation holes 18. The wire plug-in sockets 17 are for conductive wires to plug into. A push member (not shown) is disposed in the operation hole 18. A tool B can be extended into the operation hole 18 to operate the push member so as to drive an internal conductive component (not shown) and help in connecting the conductive wire plugged into the wire plug-in socket 17 with the grounding member 2 or in disconnecting the conductive wire from the grounding member 2.

The case body 1 is respectively formed with two lower sections 12, 13 adjacent to two lateral sides of the recess 11. A cavity 14 is at least formed in the lower section 12 (or the lower section 13). A hook-shaped foot section 15 extends outward from a lateral side of the lower section 12 (or the lower section 13). A first connection side 161 and a second connection side 162 are respectively disposed on two lateral sides of the foot section 15. The first and second connection sides 161, 162 are respectively connected with an outer sidewall 121 of the lower section 12. The first and second connection sides 161, 162, the outer sidewall 121, and the foot section 15 define therebetween a socket 16 with an open top side. In addition, a projection area of the first connection side 161 in a transverse direction of the socket 16 and a projection area of the second connection side 162 in the transverse direction of the socket 16 are staggered. By means of such design, the demolding operation of plastic injection in the manufacturing process can be conveniently performed.

Figure 5:
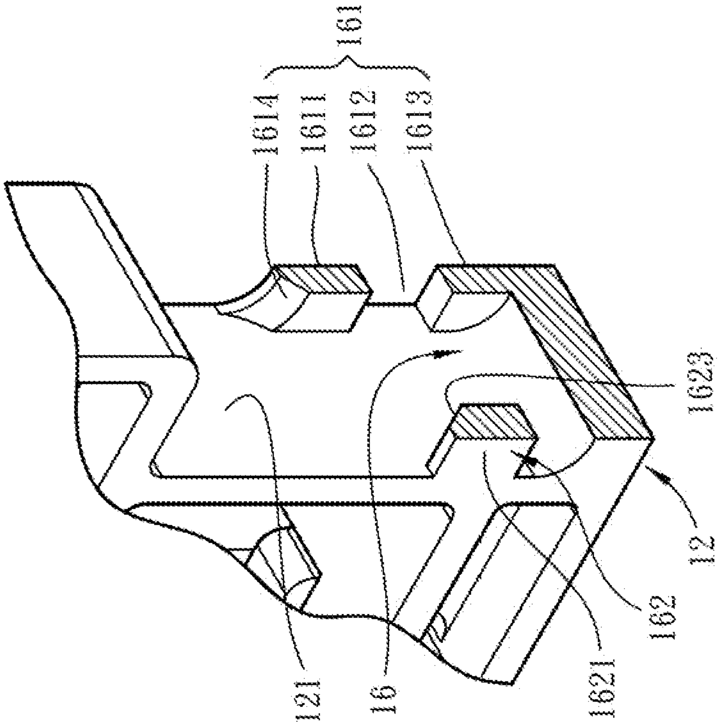
FIG. 5 is a perspective vertical sectional view of the rail terminal of the present invention, taken along a middle portion of the socket.
Figure 6:
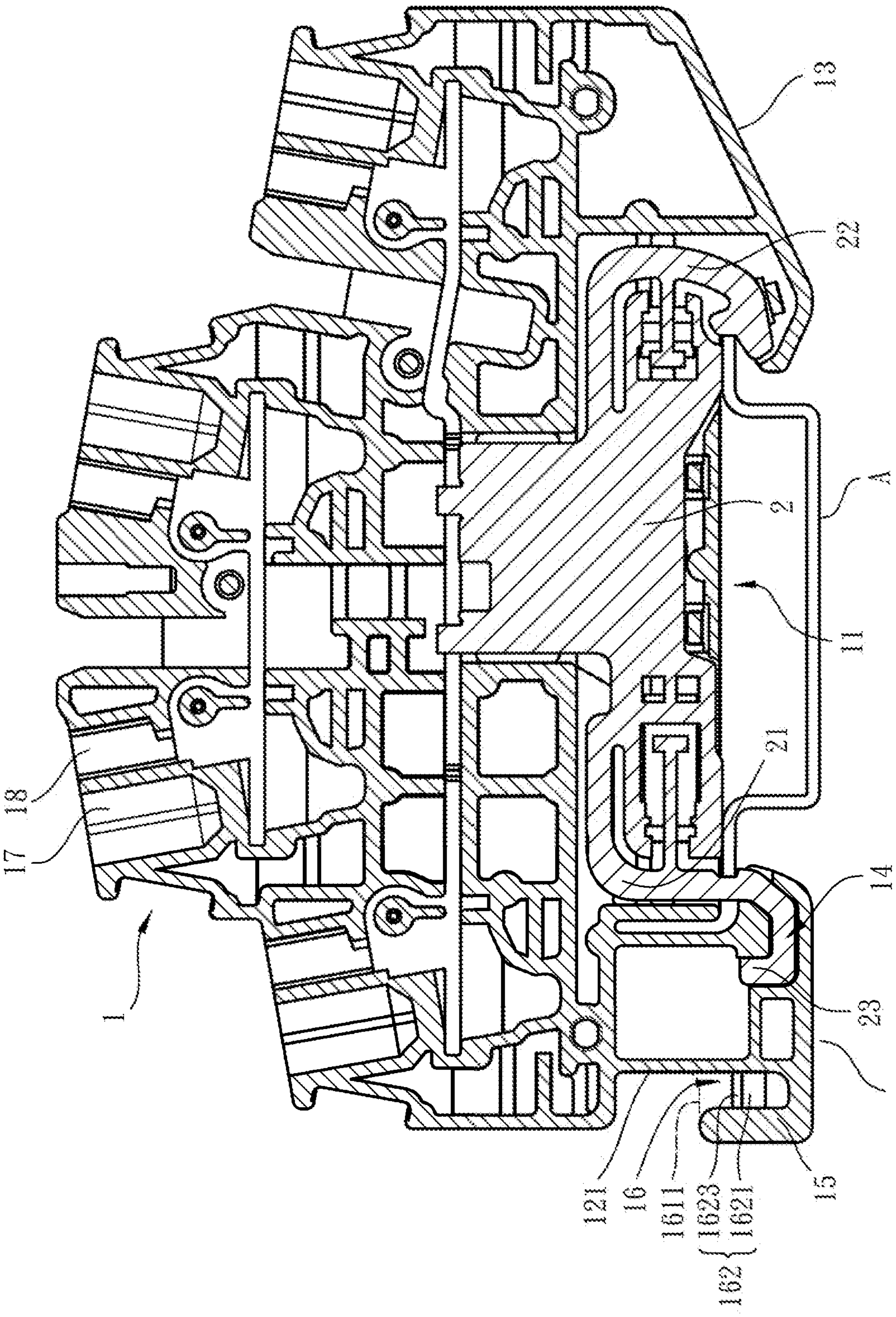
FIG. 6 is a front full vertical sectional view of the rail terminal of the present invention.
Figure 7:
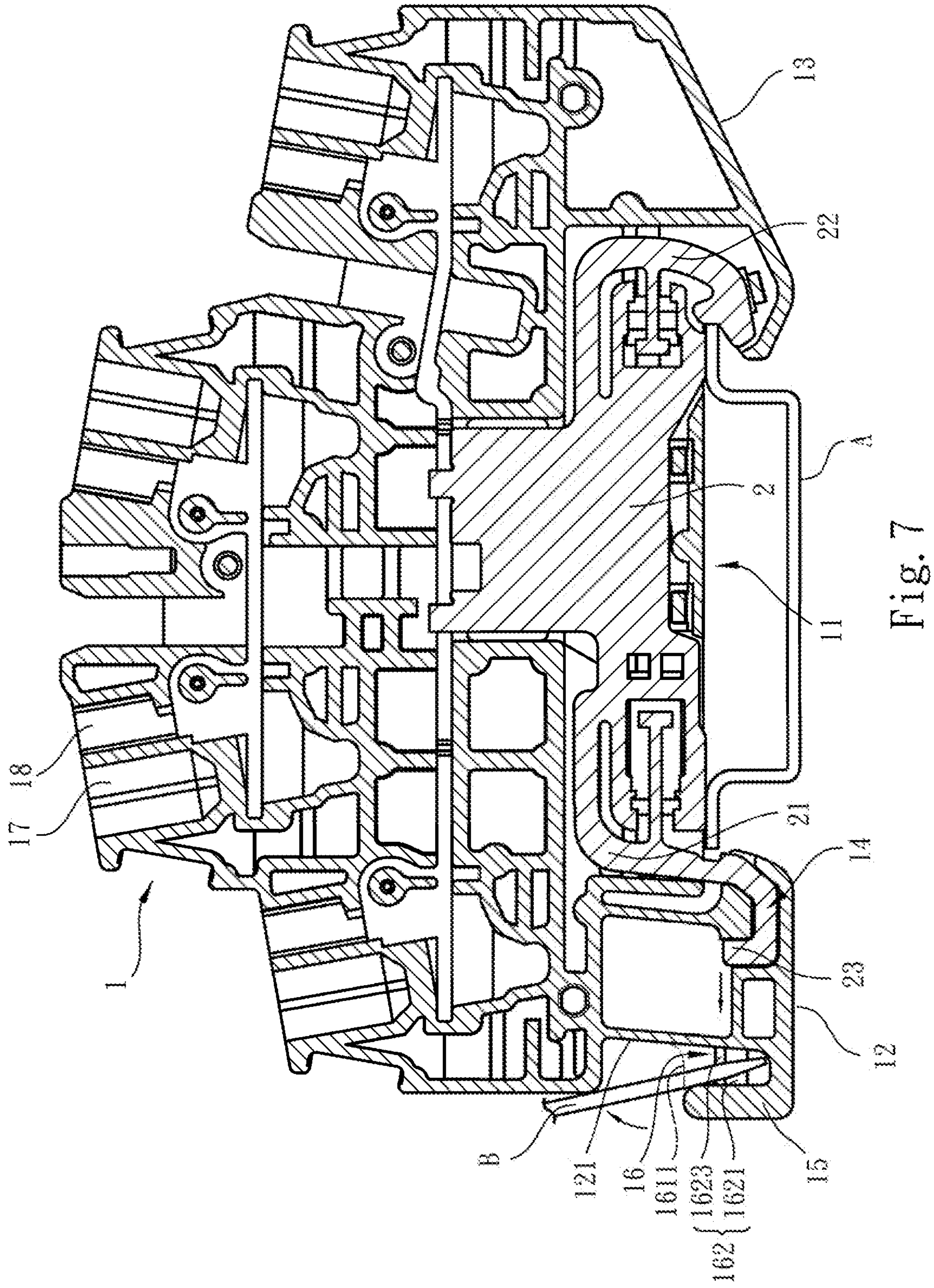
FIG. 7 is a sectional view according to FIG. 6, showing the operation of the rail terminal of the present invention.

In a preferred embodiment, the inner sides of the first and second connection sides 161, 162 are respectively formed with a first guide section 1614 and a second guide section 1623 adjacent to the opening of the socket 16. (The first and second guide sections 1614, 1623 can be downward obliquely cut plane faces). The first and second guide sections 1614, 1623 serve to guide the tool B to successfully slide from the outside environment into the socket 16. In addition, the first connection side 161 has at least one set of first connection section 1611 and first hollow section 1612, which are alternately arranged. The second connection side 162 has at least one second connection section 1621 corresponding to the first hollow section 1612. The second connection section 1621 has a configuration and a size corresponding to the configuration and the size of the first hollow section 1612; for example, as illustrated in FIG. 5, such that the second connection section 1621 could be fit into the first hollow section 1612. Accordingly, the projection area of the first connection side 161 in the transverse direction of the socket 16 and the projection area of the second connection side 162 in the transverse direction of the socket 16 are staggered.

In certain embodiments of the above structure, according to the needs of the particularly intended embodiment, the first connection side 161 can alternatively have multiple sets of first connection sections 1611 and first hollow sections 1612, which are alternately arranged. The second connection side 162 can likewise have multiple second connection sections 1621 respectively corresponding to the first hollow sections 1612. The second connection sections 1621 respectively have a configuration and a size corresponding to the configuration and the size of the first hollow sections 1612. Accordingly, the projection area of the first connection side 161 in the transverse direction of the socket 16 and the projection area of the second connection side 162 in the transverse direction of the socket 16 are staggered as a structural feature of the present invention.

An elastic first section 21 and an elastic second section 22 respectively extend from two lateral sides of the grounding member 2 to lateral sides of the two lower sections 12, 13. An elastic holding system is formed between the first and second sections 21, 22 for holding a preset grounding rail A. An extension end section of the first section 21 (or the second section 22) is formed with a hook-shaped tail section 23. The tail section 23 is inlaid in the cavity 14 of the lower section 12 (or the lower section 13), whereby the first section 21 (or the second section 22) can be elastically extended or retracted along with the movement of the lower section 12 (or the lower section 13).

During practical use of the above-described embodiment of the present invention, when the first and second sections 21, 22 of the grounding member 2 oppositely elastically hold the grounding rail A, the case body 1 is secured on the rail A with the grounding member 2. In addition, the conductive wires plugged into the respective wire plug-in sockets 17 are electrically connected with the grounding rail A. When the tool B (such as a flat-blade screwdriver) is extended into the socket 16, the first guide section 1614 or the second guide section 1623 serves to guide the tool B to successfully slide from the outside environment into the socket 16. Then, the tool B pulls outward and extends the foot section 15 to drive the lower section 12 (or the lower section 13). At this time, the first section 21 (or the second section 22) and the second section 22 (or the first section 21) are oppositely expanded, whereby the grounding member 2 can be detached from the grounding rail A.

In the above structure, the first and second connection sides 161, 162 serve as two lateral stoppers between the foot section 15 and the outer sidewall 121. Therefore, when the tool B (such as a flat-blade screwdriver) is extended into the socket 16 to pull outward and extend the foot section 15, the first and second connection sides 161, 162 enhance the structural strength of the periphery of the socket 16 to avoid twisting or deformation of the foot section 15. Also, the first and second connection sides 161, 162 prevent the tool B (such as a flat-blade screwdriver) from slipping out of the socket 16 during the force application process.

In conclusion, the rail holding structure of the rail terminal of the present invention can truly achieve the effects of enhancing the structural strength of the periphery of the socket and preventing the tool from slipping out of the socket during the force application process. The rail holding structure of the rail terminal of the present invention is inventive and advanced.

The above embodiments are only used to illustrate the present invention, and are not intended to limit the scope thereof. Many modifications of the above embodiments can be made without departing from the spirit of the present invention.

What is claimed is:

1. A rail holding structure of a rail terminal, comprising a case body and a grounding member, the case body being formed with:

an internal recess for receiving the grounding member, and two lower sections corresponding to two outer lateral sides of the grounding member, a hook-shaped foot section extending outward from at least one of the two lower sections, at least one first connection side and at least one second connection side being respectively disposed on two lateral sides of the foot section, the first and second connection sides being connected with an outer sidewall of the lower section, wherein a projection area of the first connection side in a transverse direction of the socket and a projection area of the second connection side in the transverse direction of the socket are staggered, wherein the first connection side has at least one set of connection sections, each of the at least one set of connection sections comprising a first connection section and a first hollow section which are alternately arranged, the second connection side having at least one second connection section having a configuration and a size corresponding to the configuration and the size of the first hollow section, whereby the foot section, the outer sidewall, and the first and second connection sides together define therebetween a socket with an open top side.

2. The rail holding structure of a rail terminal as claimed in claim 1, wherein inner sides of the first and second connection sides are respectively formed with a first guide section and a second guide section in adjacency to the opening of the socket, the first and second guide sections configured to guide a tool to slide into the socket.

3. The rail holding structure of a rail terminal as claimed in claim 2, wherein the first and second guide sections respectively are obliquely cut plane faces.

4. The rail holding structure of a rail terminal as claimed in claim 3, wherein a cavity is at least formed in the lower section on one side of the case body with the foot section, an elastic first section and an elastic second section respectively extending from two lateral sides of the grounding member to lateral sides of the two lower sections, an extension end section of at least one of the first section and the second section being formed with a hook-shaped tail section, the tail section being inlaid in the cavity, whereby the first section and the second section of the grounding member can be elastically extended or retracted along with a movement of the lower section.

5. The rail holding structure of a rail terminal as claimed in claim 2, wherein a cavity is at least formed in the lower section on one side of the case body with the foot section, an elastic first section and an elastic second section respectively extending from two lateral sides of the grounding member to lateral sides of the two lower sections, an extension end section of at least one of the first section and the second section being formed with a hook-shaped tail section, the tail section being inlaid in the cavity, whereby the first section and the second section of the grounding member can be elastically extended or retracted along with a movement of the lower section.

6. The rail holding structure of a rail terminal as claimed in claim 1, wherein a cavity is at least formed in the lower section on one side of the case body with the foot section, an elastic first section and an elastic second section respectively extending from two lateral sides of the grounding member to lateral sides of the two lower sections, an extension end section of at least one of the first section and the second section being formed with a hook-shaped tail section, the tail section being inlaid in the cavity, whereby the first section and the second section of the grounding member can be elastically extended or retracted along with a movement of the lower section.

* * * * *